Patented June 21, 1938

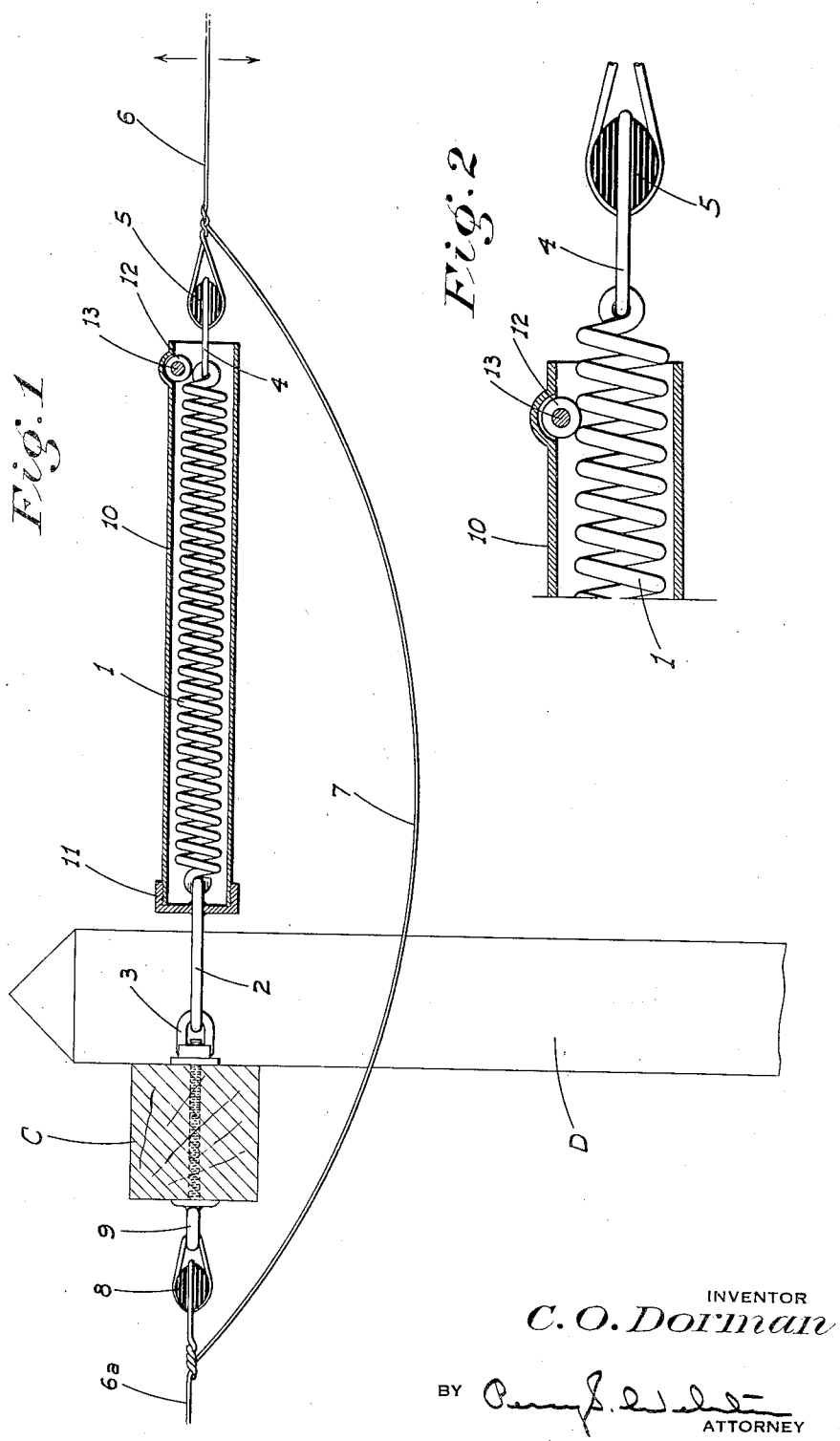

2,121,478

UNITED STATES PATENT OFFICE 2,121,478

MECHANICAL VIBRATOR AND EXPANSION DEVICE FOR TRANSMISSION LINES

Charles O. Dorman, Georgetown, Calif., assignor of one-half to Paul E. Hunter, Sacramento, Calif.

Application March 13, 1937, Serial No. 130,711

7 Claims. (Cl. 173—251)

This invention relates generally to a protective device for use in connection with telephone, telegraph and power transmission lines in those areas where snow on the lines often causes line breakage; the invention being directed particularly to an automatic mechanical line vibrator and expansion device.

In many areas during the winter, transmission line breakage, due to the weight of snow thereon, particularly of telephone lines, is quite frequent and not only causes interruption of service but costs a great deal for repair.

It is therefore the principal object of my invention to provide a device which may be interposed in a transmission line at intervals and when the line begins to sag under the weight of snow, will function to create intermittent vibrations in the line and thus shake the snow from the line and relieve the strain.

A further object of the invention is to provide an expansion element which, while being a part of the line vibrating device, also serves as an additional safeguard against line breakage.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is an elevation of the device as interposed in a transmission; the protective sleeve being shown in section.

Figure 2 is an enlarged, fragmentary view of the vibration creating mechanism.

Referring now more particularly to the characters of reference on the drawing, the numeral 1 indicates a relatively long, helical tension spring secured at one end by a heavy wire or rod 2 to the cross arm C of a line pole D by an eye bolt 3 or the like. Another wire 4 is fixed to the other end of the spring and is secured beyond the end of the spring to an insulator 5. The transmission line 6 is connected to insulator 5, in the manner shown. A looped or slack portion 7 of the line leads therefrom past the spring and pole to the other portion 6—a of said line which is connected to the cross arm C on the other side by a suitable insulator 8 and eye bolt 9. By thus connecting the spring to the line, said spring does not carry any current and does not form a resistance.

A rigid sleeve 10 is disposed about the spring in clearance relation thereto; said sleeve being supported by a cap 11 into which the sleeve is threaded. This cap is rigidly mounted on the wire or rod 2 which is in turn fixed to the inner end of the spring. A roller 12 is mounted within the sleeve adjacent the open end on a transversely extending shaft 13; said roller being of sufficient diameter to engage the coils of the spring 1.

When arranged in connection with a transmission line, my improved device functions as follows:

As the line 6 accumulates snow, the weight of such snow causes spring 1 to be extended and as such extension occurs, one coil after another of the spring engages and is then deflected by the roller 12 as shown in Fig. 2. Due to the rigid mounting of the spring relative to the sleeve at one end thereof the roller as it thus relatively passes over one coil of the spring and then drops into the space between adjacent coils, has a hammer-like action on the spring. As each coil snaps past the roller, there is a strong vibration thus created in line 6 with each such relative movement of the spring and roller, such vibration causing the accumulated snow to fall from the line. When the line is thus freed of snow, the spring contracts to a normal position.

The tension spring 1 not only serves as an important element in the vibration creating device, but itself tends to maintain the line at proper tension and to expand to absorb sudden shocks on the line such as those caused by small tree limbs and the like falling thereon. Also, the sleeve 10 serves as a protector for the spring and roller arrangement and prevents water from reaching the spring and freezing thereon and which would impair the operation of the device. By removably mounting the sleeve on the cap, the sleeve may be unscrewed therefrom and slipped off the spring for inspection or repair.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A protective device for transmission lines comprising an expansible element adapted to be interposed in a line, and means cooperating with said element to create a vibration in the line upon expansion of the element due to weight on the line.

2. A device as in claim 1 in which said element comprises a helically wound tension spring.

3. A protective device for transmission lines comprising a helically wound tension spring adapted to be disposed between one end of the line and a fixed line supporting member and means cooperating with the spring to create a vibration in the line upon expansion of the spring due to weight on the line.

4. A protective device for transmission lines comprising a helically wound tension spring adapted to be interposed in a line, a sleeve disposed about the spring, means fixedly securing the sleeve at one end to the spring, and means mounted in the sleeve adjacent the other end and cooperating with the spring to create a vibration in the line upon expansion of the spring due to weight on the line.

5. A device as in claim 4 in which said last named means comprises a roller; said roller being of sufficient size to engage and materially deflect each coil of the spring as the same expands.

6. A device as in claim 4 in which said first named means includes a cap fixedly mounted in connection with the spring; the sleeve being threaded into the cap.

7. A protector for a transmission line comprising with a line having a normally slack portion therein, a helical tension spring separate from the line disposed between the ends of the slack portion thereof, separate means connecting the ends of the spring with the line at the ends of said slack portion and means acting to impart hammer-like blows on the spring when the latter expands.

CHARLES O. DORMAN.